United States Patent [19]

Ingleson et al.

[11] Patent Number: 5,177,663
[45] Date of Patent: Jan. 5, 1993

[54] MULTILAYER DISCOIDAL CAPACITORS

[75] Inventors: Howard G. Ingleson, Grange-Over-Sands; Pamela H. Pugh, Ulverston, both of England

[73] Assignee: Oxley Developments Company Limited, Ulverston, England

[21] Appl. No.: 695,631

[22] Filed: May 3, 1991

[51] Int. Cl.⁵ .............................................. H01G 4/10
[52] U.S. Cl. ..................................................... 361/321
[58] Field of Search ...................... 361/302, 321, 320; 29/25.42

[56] References Cited

U.S. PATENT DOCUMENTS 4,247,881  1/1981  Coleman .............................. 361/302
4,864,465  9/1989  Robbins ................................ 361/321

Primary Examiner—Donald A. Griffin
Attorney, Agent, or Firm—Dykema Gossett

[57] ABSTRACT

A multilayer discoidal capacitor having a plurality of laterally spaced, planar electrodes disposed within a dielectric body and configured such that the capacitance characteristic of the capacitor is determined at least in part by the concentrated charge distribution in the "stray" electric fields arising between the edges of the electrodes and at least one cylindrical electrode extending perpendicularly to the planar electrodes.

7 Claims, 2 Drawing Sheets

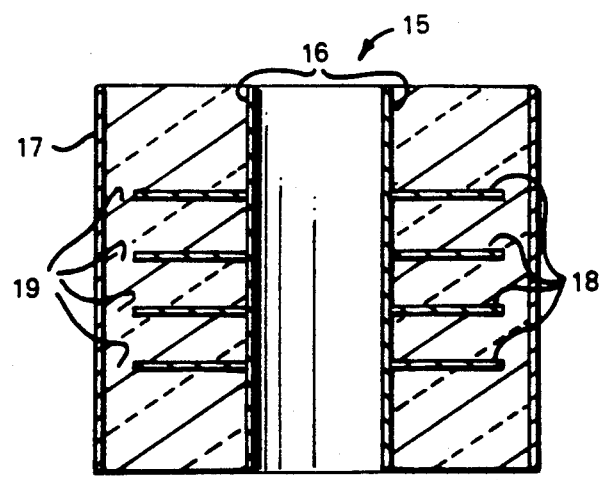
FIG. 3
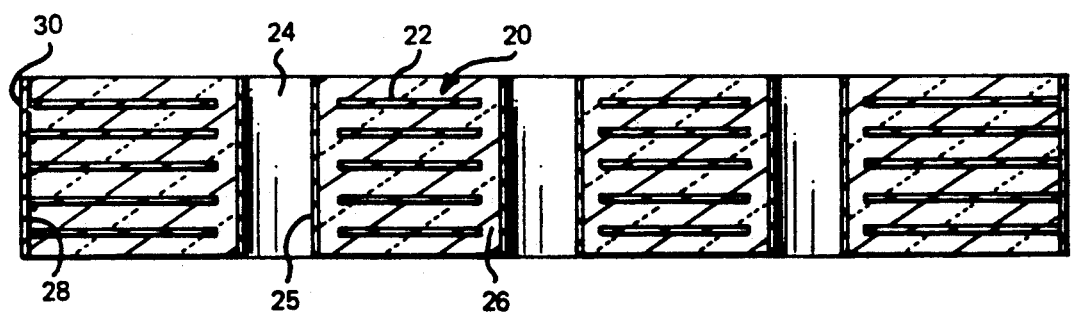
FIG. 1a
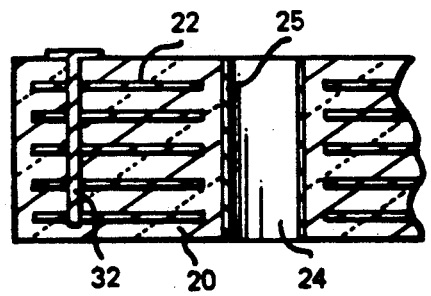
FIG. 1b
FIG. 2
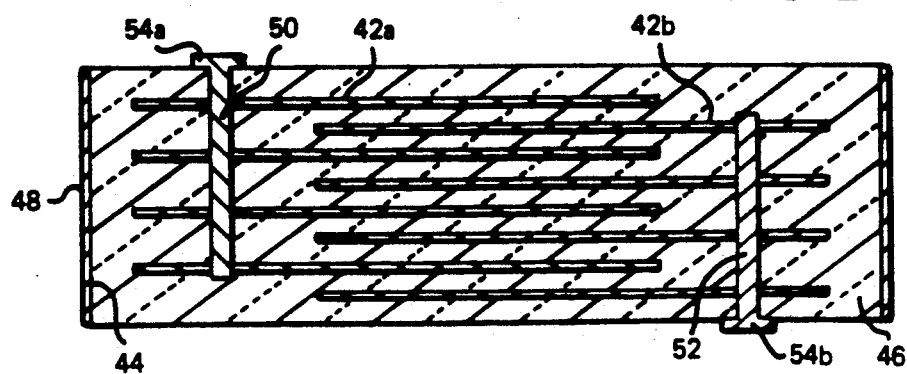

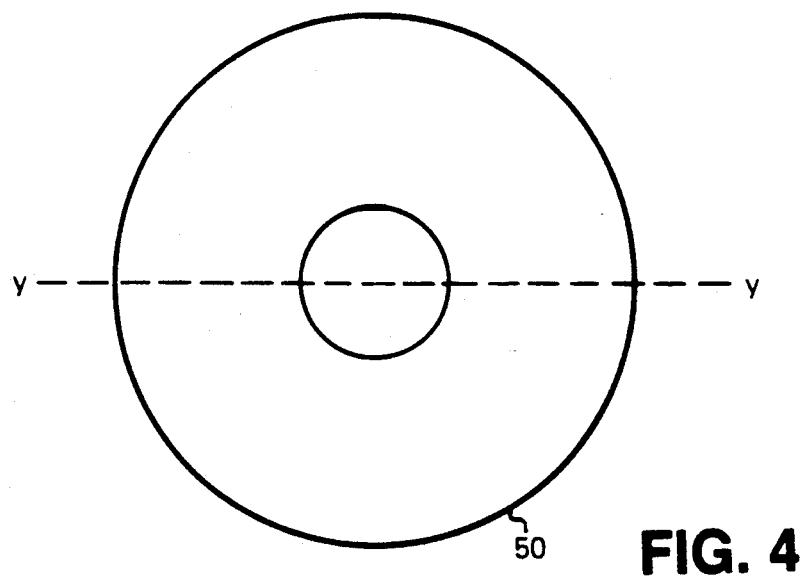
FIG. 4
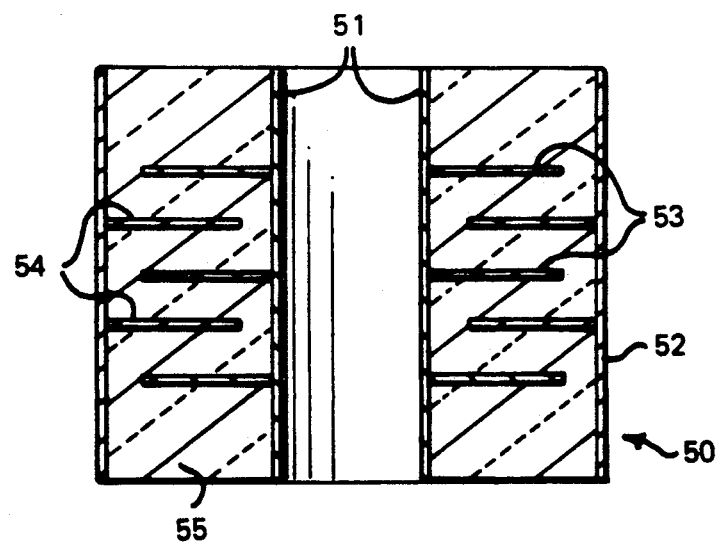
PRIOR ART   FIG. 5
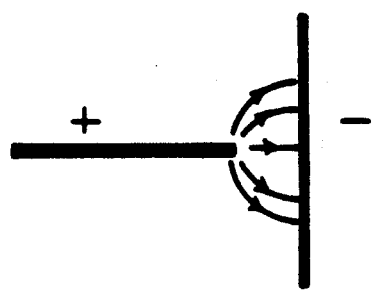
FIG. 6

MULTILAYER DISCOIDAL CAPACITORS

DESCRIPTION

The present invention relates to multilayer discoidal capacitors.

Multilayer discoidal capacitors are used, for example, to suppress electrical interference on signal and power lines. Each capacitor is constructed from appropriate ceramic materials depending on requirements and has a typical construction as shown in FIGS. 4 and 5 of the accompanying drawings, wherein a plurality of first parallel, annular electrodes 53 are embedded within a cylindrical mass of dielectric material 55 and are connected at their inner edges to an inner cylindrical metallization 51, and a plurality of second, annular electrodes 54 are embedded within the dielectric material 55 and are connected at their outer edges to an outer cylindrical metallization 52.

The total capacitance is the sum of the parallel plate capacitors between each electrode pair.

$$C_{TOT} = \Sigma \frac{\epsilon_0 \epsilon_r A}{d} \quad \text{(eq. 1)}$$

where
- $\epsilon_0$ = permittivity of free space
- $\epsilon_r$ = dielectric constant
- $A$ = area of overlap
- $d$ = separation of electrodes.

The disc construction is similar to that of multilayer chip capacitors. Their unique application requires the discoidal configuration, firstly, because the central electrode leads to a low inductance path and secondly, for ease of mechanical handling.

The requirement for capacitors having a smaller outside diameter offers substantial advantages and is in frequent demand by users. This demand leads to changes in the design of the disc in order to accommodate the same capacitance in a lower volume.

The three variable parameters in equation (1) are $\epsilon_r$, A and d. $\epsilon_r$ is limited by temperature requirements on the temperature coefficient of capacitance, and unless this is changed, it can be regarded as fixed. The separation d is limited by breakdown voltage requirements. The area A can only be increased by increasing the number of electrodes, hence making the height of the disc larger, or by reducing the distance from the edge of the electrode to the opposing termination, which increases production alignment problems.

It is an object of the present invention to provide improvements in multilayer discoidal capacitors.

In accordance with one aspect of the present invention, there is provided a multilayer discoidal capacitor having a plurality of laterally spaced planar electrodes disposed within a dielectric body and configured such that the capacitance characteristic of the capacitor is determined at least in part by the concentrated charge distribution in the "stray" electric fields arising at edges of the electrodes, and wherein the capacitance characteristic of the capacitor is determined at least in part by the "stray" electric fields arising between the edges of the electrodes and at least one cylindrical electrode extending perpendicularly to the planar electrodes.

Preferably said at least one cylindrical electrode extends through the dielectrode body, the planar electrodes having at least one corresponding region of discontinuity which surrounds said cylindrical electrode so that there exists between each planar electrode and the cylindrical electrode an annular separation.

Advantageously, the or each said cylindrical electrode is formed by metallising the wall of a cylindrical hole in the dielectrode body.

In other embodiments, the cylindrical electrode which extends perpendicularly to the planar electrodes can be located around a peripheral edge of the dielectric body, the outer peripheries of the planar electrodes terminating within the dielectric body so as to be separated from said cylindrical electrode.

By way of example only, specific embodiments of the present invention will now be described with reference to the accompanying drawings, in which:

FIG. 1a is a longitudinal cross-section of one embodiment of a multilayer discoidal capacitor in accordance with the present invention;

FIG. 1b is a partial longitudinal cross-section of a modified version of a multi-layer discoidal capacitor of FIG. 1a;

FIG. 2 is a longitudinal cross-section of a further embodiment of a multi-layer discoidal capacitor in accordance with the invention;

FIG. 3 is a longitudinal cross-section of a still further embodiment of a multi-layer discoidal capacitor in accordance with the invention;

FIG. 4 is a transverse cross-section of a discoidal capacitor of the prior art;

FIG. 5 is a longitudinal cross-section through the line y—y of the capacitor in FIG. 4 of the prior art, and FIG. 6 shows schematically the production of a "stray" electric field of the type used in the present invention.

A multilayer discoidal capacitor 50 of the prior art is illustrated in FIGS. 4 and 5 and comprises a body of dielectric material 55 of annular cross-section having coaxial inner and outer metallised terminations 51 and 52, respectively, and electrodes in the form of annular discs, the inner electrodes 53 being in electrical contact with the inner termination 51 and the outer electrodes 54 being in contact with the outer termination 52.

If the outer and inner terminations are oppositely polarised, then opposing charges will develop on the attached respective outer and inner electrodes. Charge is then distributed over the area of overlap, which is maximised between each pair of inner and outer electrodes. This is illustrated diagrammatically in FIG. 6.

In order to address the challenge of higher capacitance per unit volume and to give tight control over the spread of capacitance values, use is made in the present invention of "stray" electric fields. An example of a "stray" electric field of the type used by the present invention is illustrated in FIG. 6. As explained hereinafter, the invention makes use of the "stray" electric field from the edge of conductors rather than trying to achieve a parallel plate capacitor.

Referring first to FIG. 1, the illustrated embodiment in accordance with the present invention comprises a discoidal body 20 of dielectric (ceramic) material having a plurality of metallic disc electrodes 22 disposed therewithin in spaced parallel planes. The ceramic body 20 contains a plurality of through-holes 24 which are coated metallically so as, in effect, to form conductive tubular electrodes 25 which extend perpendicularly to the planes of the metal layers forming the disc electrodes 22. The disc electrodes 22 do not extend up to those tubular electrodes 25 but are separated from them by small annular gaps 26. Electrical contact is made to the disc electrodes 22 by metallising the peripheral surface 28 of the ceramic body as shown at 30. Alternatively, as shown in FIG. 1a, electrical connection with the disc electrodes 22 can be made by one or more conductive vias or pins 32 which are arranged to extend through the ceramic body 20.

Such a capacitor is particularly applicable to situations where space is at a premium, for example in RFI suppression devices. In the latter case, each tubular electrode 25 would receive a respective through wire (not shown) carrying signal information, the capacitor then acting as a multiway filter.

The embodiment of FIG. 2 comprises a discoidal body 40 of dielectric (ceramic) material having two pluralities of interleaved, mutually overlapping disc electrodes 42a, 42b. The disc electrodes 42 terminate within the ceramic body 40, radially inwardly of its peripheral surface 44 so as to leave respective annular gaps 46 between their outer peripheral edges and the peripheral surface 44 of the ceramic body. The latter surface 44 is provided with metallisation 48.

One set 42c of the disc electrodes are interconnected by a metal pin or conductive via 50 extending through the ceramic body 40 and the other set 42b of disc electrodes are interconnected by a metal pin or conductive via 52. The conductive pins or vias 50, 52 can terminate in respective metallised areas 54a, 54b on the end faces of the ceramic body 40 to enable external electrical connection to be made thereto.

The latter arrangement for the connections to the internal disc electrodes 42a, 42b enhances the performance of the capacitor in high humidity conditions and at high voltages (because of the wide separation of the terminations). Tubular electrodes separated from the disc electrodes as shown at 25 in FIG. 1 could also be incorporated in this embodiment to increase capacitance further.

FIG. 3 shows another embodiment of a discoidal capacitor 15 in accordance with the present invention, which has a cylindrical inner termination 16 coaxially disposed within a cylindrical outer termination 17. The capacitor 15 further comprises layers of annular discs 18, the inner circumferences of which are in contact with the inner termination 16. The diameters of the disc 18 are such that narrow annular gaps 19 arise from the separation between the outer circumferences of each disc 18 and the outer termination 17, the outer termination extending perpendicularly with respect to the discs 18. If the inner termination 16 is then polarised with respect to the outer termination 17, small areas of relatively high charge distribution will develop across the gaps 19. This results because the side edges of the discs have a relatively small surface area in comparison with that of the outer termination 17 to which they are exposed. This arrangement, as illustrated diagrammatically in FIG. 6, allows increased capacitance, independent of axial separation of the individual electrodes. For thicker walled disc electrodes, the effect can be utilised to reduce the impact of process variations and hence produce tight tolerance batches.

We claim:

1. A multilayer discoidal capacitor comprising:
a plurality of laterally spaced, planar electrodes disposed within a dielectric body; and
at least one cylindrical electrode extending perpendicularly to the planar electrodes, all of said planar electrodes being separated from said at least one cylindrical electrode so that said plurality of laterally spaced, planar electrodes are configured such that the capacitance characteristic of the capacitor is determined at least in part by the concentrated charge distribution in "stray" electric fields arising at edges of the planar electrodes, wherein the capacitance characteristic of the capacitor is determined at least in part by the "stray" electric fields arising between the edges of said planar electrodes and said at least one cylindrical electrode.

2. A multilayer discoidal capacitor according to claim 1, wherein said at least one cylindrical electrode extends through the dielectric body, said planar electrodes having at least one corresponding region of discontinuity which surrounds said cylindrical electrode so that there exists between each planar electrode and the cylindrical electrode an annular separation.

3. A multilayer discoidal capacitor according to claim 2, wherein said cylindrical electrode is formed by metallising the wall of a cylindrical hole in the dielectric body.

4. A multilayer discoidal capacitor according to claim 2, wherein the outer edges of the planar electrodes extend to the peripheral edge of the dielectric body where they are electrically connected together by a metallisation area applied to said peripheral edge of the body.

5. A multilayer discoidal capacitor according to claim 2, wherein the outer edges of the planar electrodes terminate inwardly of the peripheral edge of the dielectric body and are connected together by at least one conductive pin extending through said dielectric body.

6. A multilayer discoidal capacitor according to claim 1, wherein said cylindrical electrode which extends perpendicularly to said planar electrodes is located around a peripheral edge of said dielectric body, the outer peripheries of the planar electrodes terminating within the dielectric body so as to be separated from said cylindrical electrode.

7. A multilayer discoidal capacitor according to claim 6, wherein the planar electrodes are arranged in two sets of interleaved, overlapping electrodes, the electrodes in each said set being electrically interconnected by means of a respective conductive pin.

* * * * *